Sept. 9, 1969   R. E. KLAWITTER ET AL   3,466,452
OPTICAL APPARATUS FOR INSPECTING THE FACEPLATE-TO-FUNNEL
SEAL AREA OF A TV TUBE
Filed Dec. 23, 1966   4 Sheets-Sheet 1

FIG. I

INVENTORS
ROLAND E. KLAWITTER
ELLSWORTH M. TURLEY, JR.
HANS R. POHMANN
LOWELL W. SEBRING
BY
ATTORNEYS

INVENTORS
ROLAND E. KLAWITTER
ELLSWORTH M. MURLEY, JR.
HANS R. ROTTMANN
LOWELL W. SEBRING

BY
ATTORNEYS

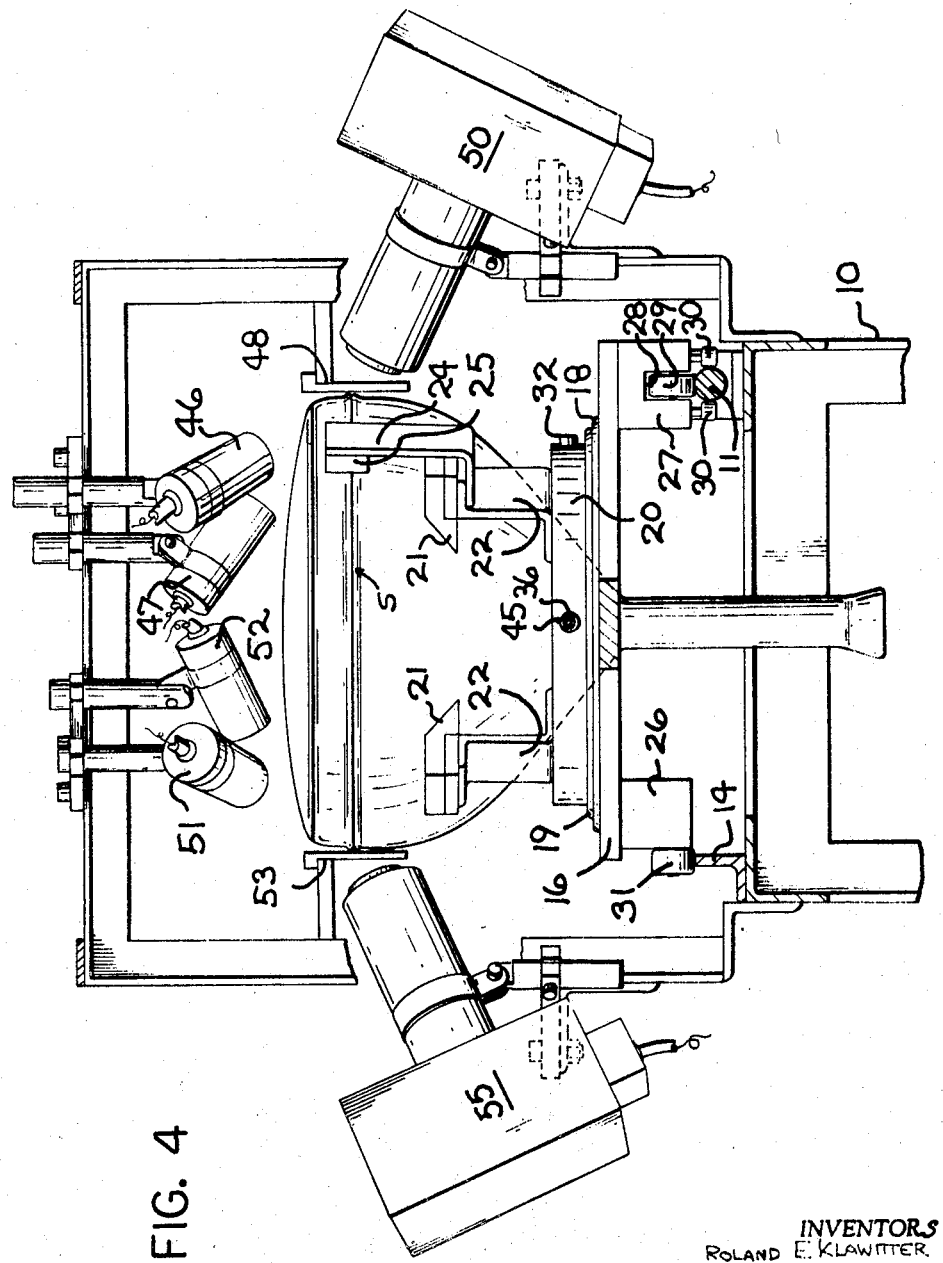

3,466,452
OPTICAL APPARATUS FOR INSPECTING THE FACEPLATE-TO-FUNNEL SEAL AREA OF A TV TUBE
Roland E. Klawitter, Perrysburg, and Ellsworth M. Murley, Jr., Toledo, Ohio, Hans R. Rottmann, Poughkeepsie, N.Y., and Lowell W. Sebring, Toledo, Ohio, assignors to Owens-Illinois, Inc., a corporation of Ohio
Filed Dec. 23, 1966, Ser. No. 604,395
Int. Cl. H01j 39/12
U.S. Cl. 250—222                                 7 Claims

ABSTRACT OF THE DISCLOSURE

A rotatable and linearly movable cradle supporting TV bulb or glass envelope is provided by which the sides of the rectangular bulb may be moved relative to a plurality of beams of light that are directed through the faceplate portion of the tube to impinge on the inside of the sealing area of the bulb. A plurality of light sensitive pickups are mounted alongside the path of movement of the cradle in fixed relationship to the light sources so that their lines of sight are directed at the illuminated seal are of the tube. The precise positions of the pickups are such that reflections from "checks" in the seal area of the tube will be sensed by the pickups.

---

This invention relates to apparatus for inspecting TV picture tubes for thermal checks in the sealing area.

More particularly, this invention relates to a method and apparatus for inspecting TV picture tubes by utilizing a plurality of light beams, illuminating the funnel-faceplate sealing area to determine the presence of minute fissures or cracks, commonly termed "checks."

This invention addresses itself to the problem of determining whether a TV picture tube formed by the heat sealing of a funnel to the faceplate has produced checks. Checks are small cracks which are formed within the seal area due to the thermal stresses set up in this area during heat sealing of the two elements together to form a TV picture tube and are detectable by the reflection of incident light impinging on the crack and being reflected therefrom. The check, as is well known, will appear to be a small mirror-like surface within the glass itself, it being understood that the thermal check will comprise a separation of glass surfaces by greater than one-half wave length of light, so that it appears as a mirror-like area within the glass.

The apparatus of the invention provides a mechanism for supporting the picture tube to be inspected such that the tube is accurately positioned and oriented with respect to a plurality of light beams and permits accurate movement of the tube relative to the light beams so that substantially the full sealing area may be scanned by the light beams and detection of beam reflection may be accomplished with a minimum of manipulation of the tube during inspecting.

It has been the practice in the past to inspect TV picture tubes by an operator observing the appearance of the tube while manipulating the tube by hand. Inasmuch as these picture tubes are fairly heavy, it becomes burdensome and cumbersome for an operator to orient the tubes so that he might be able to detect small checks. Furthermore, it is possible that many tubes which might have checks in them will go undetected.

With the foregoing in view, it is an object of this invention to provide an optical system for inspecting TV picture tubes to determine the presence or absence of checks in the sealing area where checks most frequently occur.

It is a further object of this invention to provide a method and apparatus for inspecting TV picture tubes in which the tube is automatically oriented with respect to a plurality of fixed lights so that incident light may be accurately beamed onto the area to be inspected.

It is a further object of this invention to provide a method and apparatus for inspecting TV picture tubes in which the physical manipulation of the tube may be carried out without the necessity of supporting the weight of the tube by the operator and with precision and accuracy.

Other and further objects will be apparent from the following description taken in conjunction with the annexed sheets of drawings, wherein:

FIG. 4 is a cross-sectional view of the apparatus of FIG. 2 taken at line 4—4 of FIG. 2 with the TV tube turned 90° and in position to be inspected along the long side of the tube.

Figure 1:
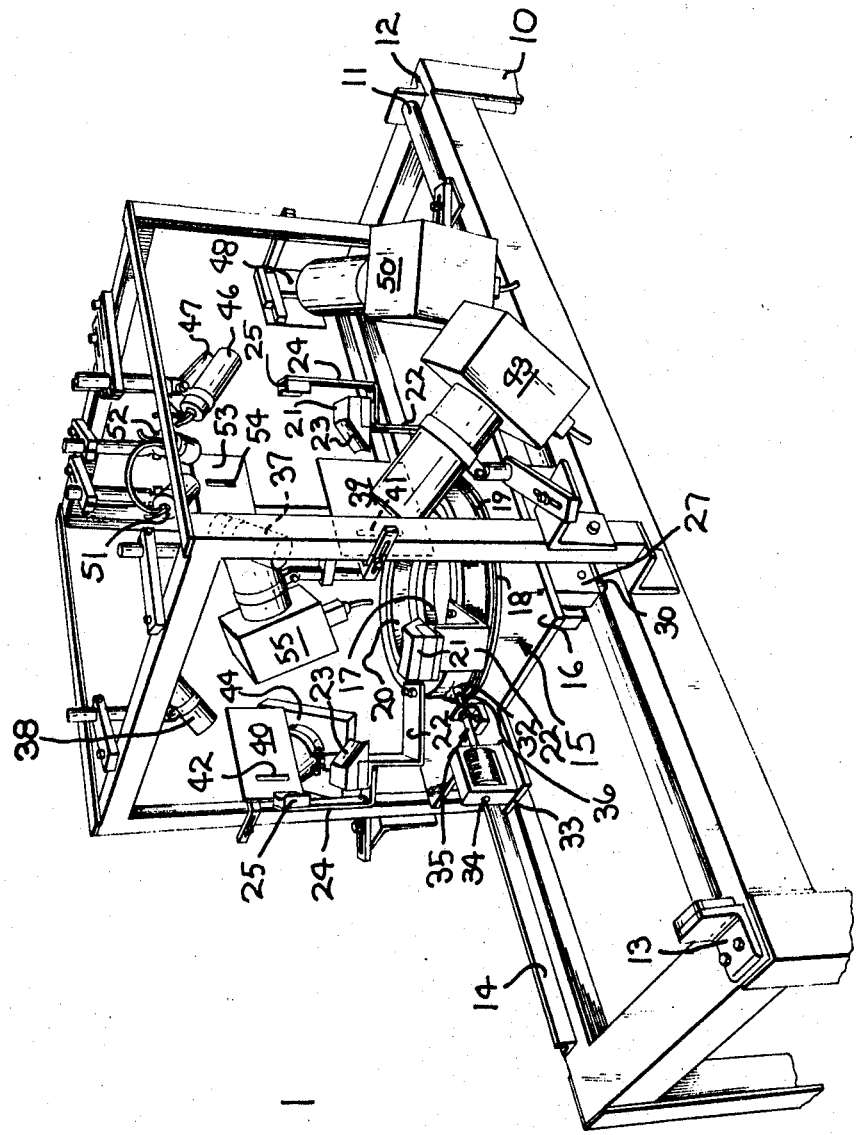
FIG. 1 is a perspective view of the inspection apparatus of the invention.

With reference to FIG. 1, the apparatus of the invention can be seen to comprise a bench-like base 10 to the upper surface of which is mounted a horizontal rod 11. The rod 11 is supported above the base by a pair of angle brackets 12 and 13 positioned at opposite ends of the rod. As can be seen when viewing FIG. 1, rod 11 extends throughout substantially the full horizontal length of the base 10 and is located along one side thereof. At the opposite side of the bench, and in parallel with the rod 11, is mounted an angle iron 14. The rod 11 and angle iron 14 serve as a guide rail and supporting rail, respectively, for a tube supporting mount or cradle, generally designated 15.

The tube mount 15 is comprised of a flat, generally rectangular plate 16 having a circular opening 17 formed centrally thereof. The opening 17 has positioned therein an annular ball bearing race 18 which, in combination with a complementary ball bearing race 19, provides a rotary support for a cylindrical sleeve 20. It should be understood that the sleeve 20 is fixed to the inner annular race 19 and the upper annular surface of the sleeve 20 has four funnel-supporting members 21 carried thereby by four brackets 22.

As can be seen when viewing FIG. 1, the members 21 are spaced about the sleeve at 90° intervals and are mounted to the sleeve by the spaced brackets 22. Each of the supporting members 21 has a bevelled, inwardly sloping surface 23 contoured to support and engage the funnel portion of a TV picture tube. It should be kept in mind that TV picture tubes are formed in two pieces with the lower portion being termed the "funnel" and the face portion being termed the "faceplate," with the faceplate having an annular depending skirt. It is the annular edge of the skirt which is heat sealed to the upper edge of the funnel to form a complete picture tube envelope. It is during the heat sealing of the funnel to the faceplate skirt that thermal checks may occur. Furthermore, it should be kept in mind that nearly all of the picture tubes which are presently produced, are generally rectangular in shape. The actual contour of a picture tube is clearly illustrated in FIG. 2 where it can be seen that the tube is generally rectangular in appearance when viewing the faceplate.

In addition to the supporting members 21, the brackets 22 carry vertically extending brackets 24 to the upper end of which, on the innerfaces thereof, are mounted tube corner-engaging pads 25.

As shown in FIG. 1, only two of the brackets 22 carry corner-engaging pads 25. It has been found that when positioning a TV picture tube on the tube mount 15, it is extremely important that the tube be supported and positioned accurately with respect to its longitudinal center line in order for the later-to-be described optical system to function properly.

It is with this in view that the corner-engaging pads 25 are provided so as to ensure the accurate positioning of the tube; however, it should be realized that only the diagonally opposite corners of any particular TV tube need be accurately positioned since these two points will define the position of the tube relative to its mount. The angular relationship of the tube with respect to the tube mount must be such that the longitudinal axis of the tube will extend parallel to the rod 11 and angle iron 14 when the mount is in a particular rotational position.

Applicants have found that by providing two corner-engaging pads 25 positioned at diametrically opposed points, the tube, when properly seated, will have its faceplate substantially horizontal and the vertical axis of the picture tube will be substantially vertical.

The tube mount 15 is supported and guided for longitudinal motion by a pair of roller-supporting, horizontal members 26 and 27 which extend along the under side of the plate 16 and are connected thereto.

As can best be seen when viewing FIGS. 1 and 4, the member 27 is provided with a longitudinal groove 28 extending its full length and a series of rollers 29 are supported within the groove 28. The rollers 29 are adapted to engage the rod 11 and utilize the rod as its track. To prevent the roller 29 from becoming disengaged from the top surface of the rod 11, a plurality of rod side-engaging rollers 30 are mounted to the under-surface of the member 27 on opposite sides of the groove 28. In this manner the mount 15 is confined to horizontal, straight line movement. The opposed, roller-supporting member 26 carries a plurality of rollers 31 which are adapted to engage the upper edge of the angle iron 14, thus utilizing the surface of the angle iron 14 as its track. In this manner, the plate 16 and the picture tube supported thereby may be moved horizontally with respect to the base 10 with reasonable precision and accuracy.

As previously described, the sleeve 20 is supported for rotation with respect to the plate 16, thus providing an arrangement for rotating the tube about its vertical axis. This ability to rotate the tube is necessary from the standpoint of the optical inspection system to be described.

Rotation of the sleeve 20 is normally performed by hand with the tube resting in the support; however, it is important that when the tube is to be inspected, it be accurately positioned and with this in view, the sleeve 20 is provided with a detent-receiving member 32, with the member 32 being accurately located midway between two adjacent tube-supporting brackets 22. The plate 16 carries a supporting bar 33 which extends horizontally outwardly from the front thereof and supports a solenoid 34. The solenoid 34 is of the push-pull type with its armature connected to a shaft 35 whose outer end carries a detent 36. The detent 36 is adapted to be moved into the detent-receiving member 32 to effectively lock the sleeve in a predetermined angular position. A second detent-receiving member 45, similar to detent-receiving member 32, is provided in the exterior of the sleeve 20 space 90° from detent-receiving member 32. This then defines the second position of the sleeve and the picture tube for inspection purposes.

The tube is positioned within the mount 15 when the mount is withdrawn to the left when viewing FIG. 1. As will be clearly understood, the TV picture tube is rectangular in plan view and one axis of the tube is substantially longer than the other axis so the tube is located in its initial inspection position such that its longest axis is normal to the rod 11. With the tube thus positioned, it is moved longitudinally into the position illustrated in FIG. 3.

As the tube enters the gauging position, a pair of lights 37 and 38 positioned above the face of the tube project beams of light downwardly through the face of the tube so as to impinge upon the seal area designated S. It should be understood that the lights 37 and 38 have a lens system such as to provide generally circular beams of light and with the angular relationship illustrated in the drawings, the beams when they penetrate and become incident on the seal area of the picture tube will be elongated vertically. In this manner a spot of light is focused on the seal area at the sealing line on both of the short sides of the picture tube. A pair of masks 39 and 40 are mounted with their axes parallel to the sides of the picture tube. The masks are provided with vertical slits 41 and 42, with the slits 41 and 42 being positioned generally opposite the point of impingement of the incident light upon the seal area of the picture tube. In back of the slit 41 is positioned a light sensitive pick-up 43, its being understood that the pick-up 43 has a suitable collecting lens system mounted therewith so as to focus an image of the slit onto a photo-sensitive detector contained within the pick-up unit. Behind the mask 42 there is provided a second light-sensitive pick-up 44 of substantially the same construction as that of the pick-up 43.

Figure 2:
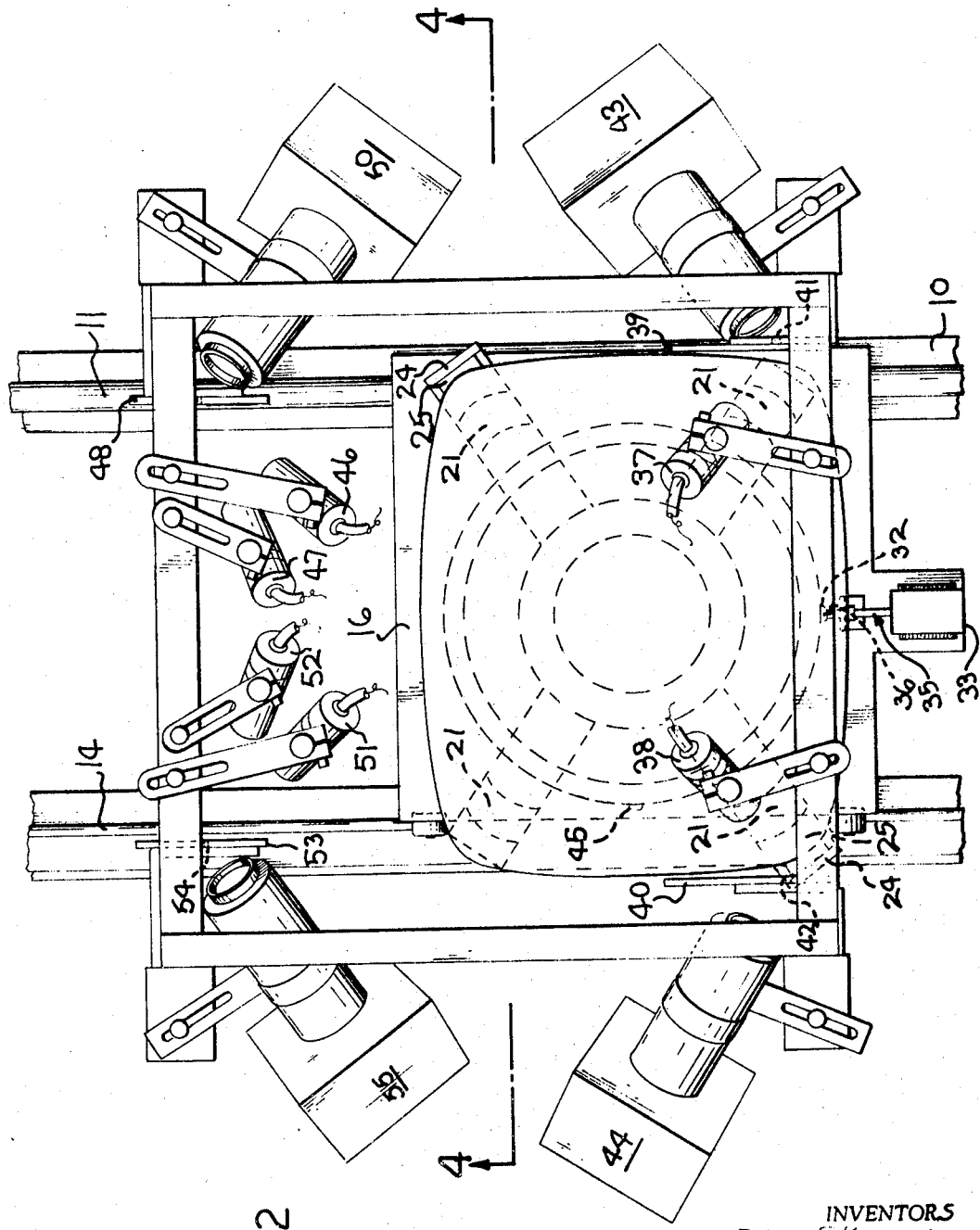
FIG. 2 is a top plan view of the optical inspection apparatus of the invention of FIG. 1.

The lights 37 and 38 are arranged such that their output beam axes are at approximately an angle of 55° with respect to the plane of the masks 39 and 40, when viewing the lights in plan view, FIG. 2.

The axes of the photo-sentitive pick-ups 43 and 44 are also positioned to be approximately 55° with respect to the plane of the masks. These recited angles are with respect to a horizontal plane. The lights and pick-ups are angularly related in the vertical plane, such that their axes are downwardly inclined to the horizontal at approximately 135°. The pick-ups are arranged such that their axes are oriented 120° upwardly from the horizontal. It has been found that this angular relationship is satisfactory for providing optimum illumination of the seal area and the angularity of the pick-ups with respect to the masks are such that light reflected from checks will be picked up and sensed by the light-sensitive pick-ups 43 and 44.

With this arrangement of lights and pick-ups, the placement of the tube in its mount and movement of the tube horizontally past the masks will provide a scan of the short sides of the tube seal area. After the short sides of the tube have been inspected, the tube and mount is withdrawn and rotated 90° with the detent 33 retracted. When the mount has been properly turned, the detent 33 will fall into the detent-receiving member 45 which is 90° displaced from the detent-receiving member 32. Thus the tube will be positioned with its long sides parallel to the direction of travel of the tube mount and when the mount and tube are moved to the position illustrated in FIG. 4, the long sides of the tube will be inspected optically for checks.

The optical inspection system for the long sides of the tube is similar to that previously described with respect to the system for examining the short sides of the tube. However, in this instance, it has been found necessary to provide two sources of illumination directed into the seal area from two different angles so as to provide two direction illumination. As previously stated, the light which will be reflected from a defect or check will be at the same angle as the incident beam which illuminates the defect. Most checks which occur during the heat sealing of picture tubes will be substantially radial in the sense that they will be vertical checks with the plane of the check itself being nearly normal to the external wall of the tube. The long side of the tube has a radius of curvature, thus presenting the problem that a single stationary beam of incident light would strike these checks at different angles depending upon where the check occurs in the length of the seal area.

With this in view, applicants have provided a dual angle, incident light, illumination system with a single detector associated with the two light system. It has been found that by properly selecting the angles by which the two lights strike the tube, all of the checks which may occur within the seal area along its curved surface will be reflected in a manner such that a single pick-up will view these reflections.

Figure 3:
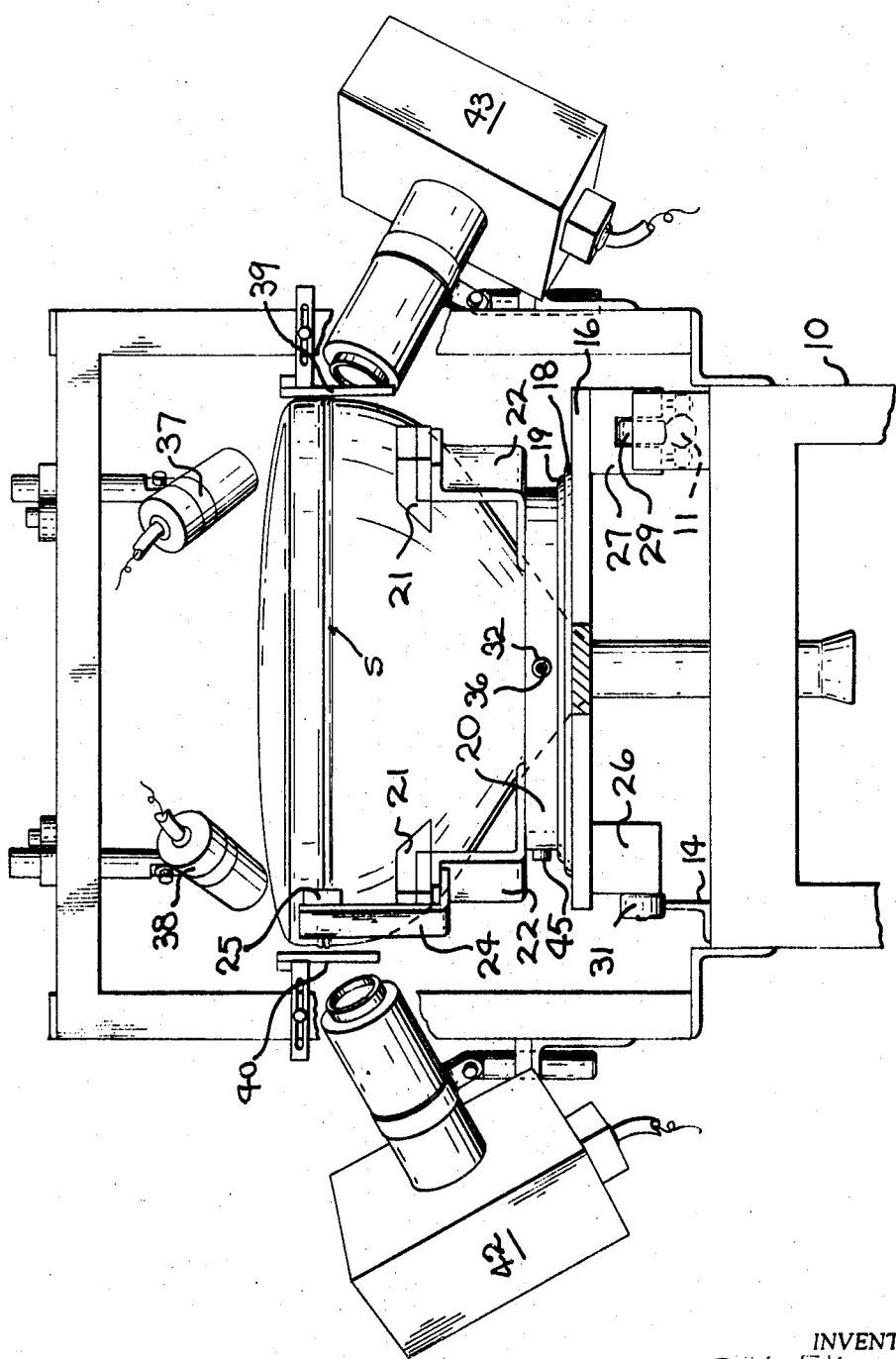
FIG. 3 is an elevational view of the apparatus of FIG. 1 illustrating a TV tube positioned in the apparatus for inspecting the short side of the tube.

With the foregoing in view, and as shown specifically in FIGS. 1, 3 and 4, a pair of lights 46 and 47 are positioned above the tube with their axes oriented so as to illuminate the seal area of the tube internally at a position opposite a fixed mask 48. The mask 48, as best shown in FIG. 1, is provided with a vertical slit 49. When a check reflects the incident light, it will reflect the light in the direction of the slit 49. A light-sensitive pick-up 50 is positioned in back of the mask and at such an angle that it will receive light reflected from a check in the tube through the mask slit 49. It has been found that if the light 46 is positioned with its axis at approximately 33° with respect to the plane of the mask, and with the light 47 positioned at a 51° angle with respect to the mask, light from either light source will be reflected from defects and will pass through the mask slit to be sensed by the pick-up 50.

Inasmuch as the picture tube has two long sides, a similar pair of lights 51 and 52 mounted above and with their axes positioned in relation to a mask 53 at the same angles as indicated above for the lights 46 and 47, defects in the left-hand side of the tube, as viewed in FIG. 4, will cause reflections in the direction of the mask 53.

The mask 53 has a vertical slit 54 formed therein and a photo-sensitive pick-up 55 positioned below and with its optical lens system directed toward the slit 54 will sense any light reflections from defects in the tube which pass through the slit 54.

Thus it can be seen that the apparatus of the invention provides an arrangement for supporting a television picture tube with its funnel axis substantially vertical and accurately located so that the tube may be passed through two inspection zones consecutively so as to provide an accurate system for detecting optical defects such as checks which may occur during the sealing of TV tube components, namely, the faceplate and funnel.

As can be seen when viewing the drawings, the lights, as well as the pick-ups, are all adjustably connected or mounted on the ends of shafts and in turn the shafts are clamped to stationary frame members in such a manner that each of the shafts may be rotated about its axis to reorient or adjust the angularity of the lights and pick-ups with respect to the tube being inspected. For each particular design of tube there may be a single group of settings for each of the lights and pick-ups. For tubes of different size or of different contour, for example, where the tube is more rounded, it will be necessary to adjust the lights and the pick-ups so that the relative orientation of these will provide the maximum signal output when viewing a defect.

Inasmuch as glass is reflective with respect to incident light striking it as less than Brewster's angle for glass, it was found necessary to use masks to prevent stray light which may be present in the factory from being reflected from the surface of the faceplate and being picked up by the light-sensitive pick-ups. The masks, in effect, then are an arrangement for preventing stray light entering the light-sensitive system, thus improving the signal to noise ratio.

It should be understood that each of the pick-ups will be connected to suitable signal amplifying and indicating means (not shown) such as lights or meters.

Other and further modifications may be resorted to without departing from the spirit and scope of the appended claims.

We claim:

1. Apparatus for inspecting rectangular TV tubes for defects in the faceplate-funnel seal area thereof comprising, a base, a support cradle for holding an assembled tube with its axis substantially vertical, means pivotally mounting said cradle to said base, at least one light source projecting a narrow beam of light at a preselected angle through the face of said tube to illuminate a narrow vertical portion of the seal area internally thereof, rail means mounted on said base and extending horizontally along the length of said base, means mounting said cradle for movement on said rail means, means for moving the tube and cradle relative to said beam to provide successive illumination of the seal area of the tube, a light-sensitive pick-up mounted to said base at an angle with respect to said beam direction for viewing the illuminated area and means connected to said pick-up for indicating the presence of defects by the reception of light by the pick-up.

2. The apparatus of claim 1, further including means mounted above the tube for projecting a second narrow beam of light through the tube to impinge on the seal area from a different angle from the first beam to thereby illuminate the same seal area at a different angle of incidence whereby all defects in the curved edge of the seal area will reflect light downwardly and outwardly in the direction of the light-sensitive pick-up.

3. The apparatus of claim 2, further including a mask having a vertical slit therein positioned adjacent the external seal area of the tube opposite the area of illumination thereof for limiting the light reaching the pick-up to that reflected from a defect in the bulb.

4. The apparatus of claim 2, further including at least two additional light sources mounted above the tube for projecting two additional beams at the opposite side seal area of the tube, and a second light-sensitive pick-up mounted at the side of the tube for viewing the illuminated area of said opposite side of the tube.

5. Apparatus for inspecting the faceplate-to-funnel seal area of a rectangular TV picture tube comprising, a base, a pair of spaced-apart, horizontal slideways extending the length of said base, a plate positioned on and spanning the space between said slideways, said plate adapted to move horizontally thereon, a tube supporting and positioning cradle mounted on said plate, an open frame structure connected to said base and serving as the mounting structure for a plurality of light sources and light-sensitive pick-ups, a pair of narrow beam producing lights mounted on said frame with their beams directed downwardly and outwardly so as to illuminate the seal area of the short sides of a tube positioned in the cradle by passing the light through the faceplate of the tube, a pair of light-sensitive pick-ups mounted on said frame with their axes directed upwardly toward the illuminated seal area of the tube, a mask having a vertical slit therein mounted on each side of the frame in close proximity to the seal area of the short sides of the tube with the slit limiting the view of its respective pick-up to the illuminated seal area of the tube, and indicating means connected to the pick-ups.

6. The apparatus of claim 5, wherein said tube-supporting and positioning cradle comprises, an annular sleeve rotatably mounted on the upper surface of the plate, four equi-spaced tube funnel-engaging members mounted on said sleeve and two tube corner-engaging pads mounted on two of the diametrically opposed funnel-engaging members, said pads having inwardly facing, contoured faces adapted to engage the corners of the tube at the seal area.

7. The apparatus of claim 5, further including a second pair of narrow beam light sources mounted above said cradle and spaced from said first pair in the direction of the slideways, said second pair of light sources providing downwardly and outwardly directed beams which illuminate the long side seal area of the rectangular tube when positioned therebeneath, a second pair of light-sensitive pick-ups mounted at the side of said slideway and positioned to view the illuminated areas of the long sides of the tube, a third pair of narrow beam light sources mounted above said cradle with their beam axes directed downwardly and outwardly against the tube at angles which are different than the beams from said second pair of lights but directed to illuminate the same seal area of the long side of the tube whereby defects formed in the long side of the tube will be illuminated from two angles and said second pair of pick-ups will view reflections from defects regardless of the precise orientation of the defects.

References Cited
UNITED STATES PATENTS

| | | | |
|---|---|---|---|
| 3,176,842 | 4/1965 | Fry | 88—14 |
| 3,245,533 | 4/1966 | Rottman | 250—223 |

RALPH G. NILSON, Primary Examiner

MARTIN ABRAMSON, Assistant Examiner

U.S. Cl. X.R.

250—223